US012766645B2

(12) United States Patent
Chase

(10) Patent No.: US 12,766,645 B2
(45) Date of Patent: Oct. 20, 2026

(54) FLOATING SYSTEM AND METHOD FOR A TOOL

(71) Applicant: Legacy Industries, Auburn Hills, MI (US)

(72) Inventor: Wylie Chase, Clarkston, MI (US)

( * ) Notice: Subject to any disclaimer, the term of this patent is extended or adjusted under 35 U.S.C. 154(b) by 1028 days.

(21) Appl. No.: 17/975,849

(22) Filed: Oct. 28, 2022

(65) Prior Publication Data

US 2023/0135381 A1 May 4, 2023

Related U.S. Application Data

(60) Provisional application No. 63/274,261, filed on Nov. 1, 2021.

(51) Int. Cl.
*B23K 37/02* (2006.01)

(52) U.S. Cl.
CPC ................................ *B23K 37/0211* (2013.01)

(58) Field of Classification Search
CPC ... B23K 11/14; B23K 11/115; B23K 37/0408; B23K 37/047; B23K 37/0241; B23K 37/0211
See application file for complete search history.

(56) References Cited

U.S. PATENT DOCUMENTS 2,685,018 A * 7/1954 Mynar, Jr. ......... B23K 11/0046 219/79
2,843,166 A * 7/1958 Van Alstyne ......... B23P 19/006 81/57.37
4,754,116 A * 6/1988 Naruse ................... B23K 11/14 219/79
5,295,295 A * 3/1994 Aoyama ................. B25B 23/04 81/433
5,530,218 A * 6/1996 Nakamura ........... B23K 11/314 219/86.25
5,557,841 A * 9/1996 Aoyama ................ B23K 9/206 81/125
6,337,456 B1 * 1/2002 Taniguchi ............ B23K 11/315 219/86.25
6,768,082 B2 * 7/2004 Aoyama ................ B23K 9/201 219/125.11
8,294,064 B1 * 10/2012 Raiche ............... B23K 11/3081 219/136
8,336,716 B2 * 12/2012 Aoyama ................... B07C 5/08 209/660
8,338,738 B2 * 12/2012 Aoyama ................ B23K 9/206 219/80
9,849,540 B2 * 12/2017 Lee ...................... B23K 11/312
9,895,775 B2 * 2/2018 Koscielski ............. B65G 19/02
10,471,549 B2 * 11/2019 Koscielski ............ B23P 19/001
(Continued)

FOREIGN PATENT DOCUMENTS

DE 102007062474 A1 * 7/2009 ........... B23K 11/318

*Primary Examiner* — Brian W Jennison
(74) *Attorney, Agent, or Firm* — FisherBroyles, LLP; Douglas P. LaLone

(57) ABSTRACT

A tool may include a column system, a floating system, and/or an electrode system. The floating system may be connected to the column system. The floating system may include an energizer. The electrode system may be connected to the floating system. The floating system may automatically return the electrode system to a home position when an external force moves the electrode away from the home position.

20 Claims, 20 Drawing Sheets

(56) References Cited

U.S. PATENT DOCUMENTS

| | | | | | |
|---|---|---|---|---|---|
| 10,836,005 | B2 * | 11/2020 | McIntosh | B25B 5/061 | |
| 11,179,798 | B2 * | 11/2021 | Aoyama | B23P 19/06 | |
| 11,517,974 | B2 * | 12/2022 | Noack | B23K 11/315 | |
| 11,654,517 | B2 * | 5/2023 | Reenders | B23K 11/002 | 219/119 |
| 11,883,908 | B2 * | 1/2024 | Koscielski | B23K 11/14 | |
| 12,330,319 | B2 * | 6/2025 | Bélanger | B25J 11/005 | |
| 2003/0039532 | A1 * | 2/2003 | Aoyama | B23K 11/28 | 414/908 |
| 2003/0127432 | A1 * | 7/2003 | Aoyama | B23K 11/14 | 219/93 |
| 2003/0189033 | A1 * | 10/2003 | Aoyama | B23K 9/201 | 219/125.1 |
| 2010/0059486 | A1 * | 3/2010 | Aoyama | B23P 19/06 | 219/79 |
| 2012/0074631 | A1 * | 3/2012 | Dagenais | B23K 37/0276 | 269/37 |
| 2015/0165544 | A1 * | 6/2015 | Molina Mesa | B23K 11/315 | 219/86.33 |
| 2016/0354872 | A1 * | 12/2016 | Koscielski | B21J 15/32 | |
| 2017/0072454 | A1 * | 3/2017 | Wilcox | B23K 11/0053 | |

* cited by examiner

FLOATING SYSTEM AND METHOD FOR A TOOL

CROSS-REFERENCE TO RELATED APPLICATIONS

This application claims priority to U.S. Provisional Application No. 63/274,261 filed on Nov. 1, 2021, the contents of which is hereby incorporated by reference in its entirety.

TECHNICAL FIELD

The present disclosure generally relates to floating systems, which may be utilized in connection with tools.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some floating systems do not provide sufficient functionality. Some floating systems may be complicated, may be difficult to operate, may be expense, and/or may be difficult to assemble.

There is a desire for solutions/options that minimize or eliminate one or more challenges or shortcomings of floating systems. The foregoing discussion is intended only to illustrate examples of the present field and is not a disavowal of scope.

OVERVIEW

In some examples, a tool for manufacturing a product may include a column system, a floating system, and/or an electrode system. The floating system may be connected to the column system and/or the floating system may include an energizer. The electrode system may be connected to the floating system. The floating system may be configured to automatically return the electrode system to a home position when an external force moves the electrode system away from the home position.

In some implementations, a tool may include a first plate, a second plate, and/or a floating system. The second plate may be spaced apart from the first plate. The floating system may be disposed at least partially between the first plate and the second plate and/or the floating system may include an energizer. The first plate may move relative to the second plate. The floating system may be configured to automatically return the first plate to a home position when an external force moves the first plate away from the home position. Such may occur after a manufacturing step has been performed on a part.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
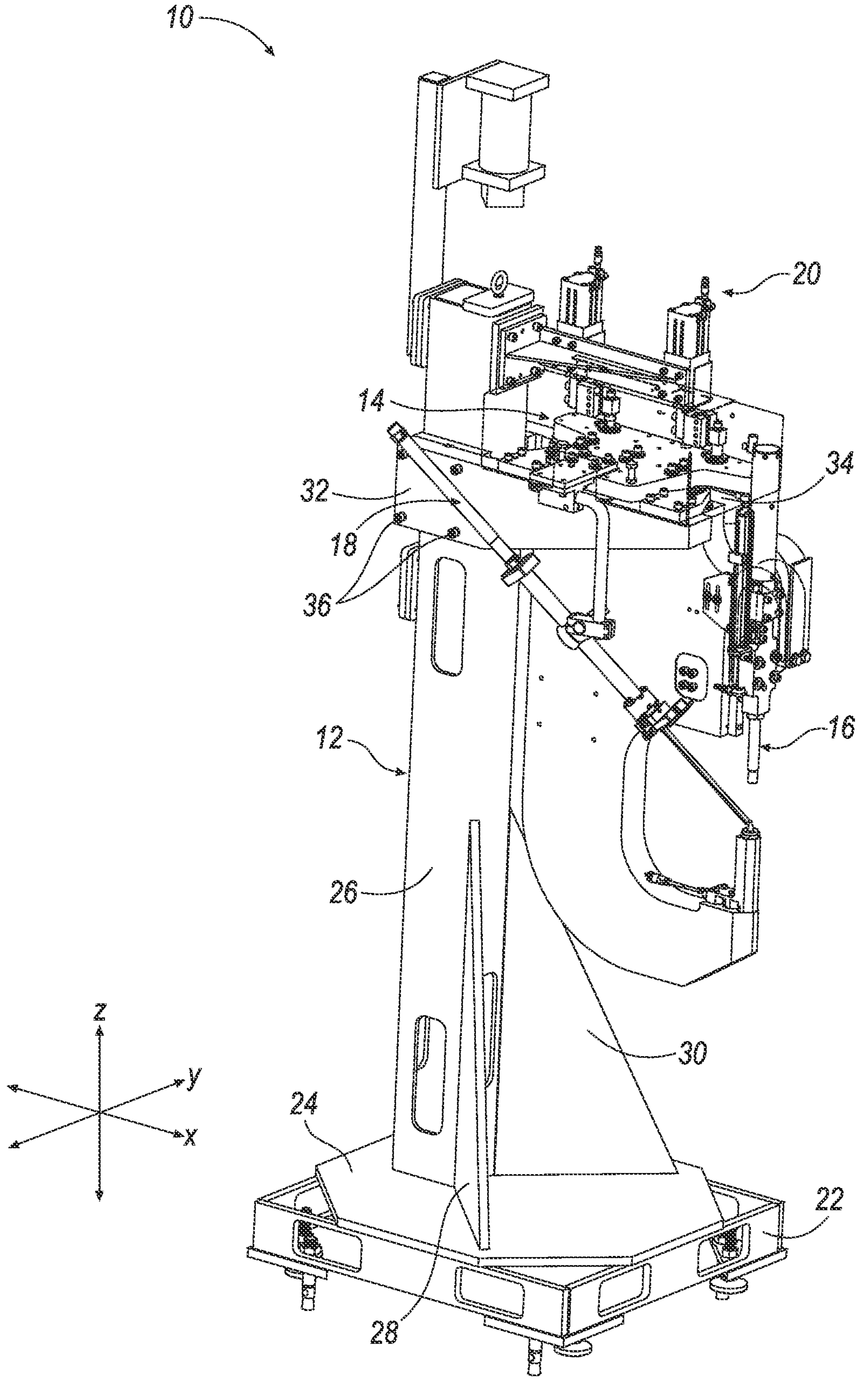
FIG. 1 is a perspective view generally illustrating an embodiment of a tool that is used to manufacture a part.

With reference to FIG. 1, a tool 10 is provided. While the tool 10 is generally shown and described herein as being a welding tool (e.g., a resistance welding tool), it will be appreciated that the tool 10, or parts thereof, may include, or otherwise be utilized in connection with other types of tooling within the scope of the present disclosure.

In some example configurations, the tool 10 may include a column system 12, a floating system 14, an electrode system 16, a feeder system 18, and a lock system 20. The column system 12 may be arranged upon and/or may extend from a base 22 (e.g., in the Z-direction). The floating system 14 may be connected to the column system 12. The electrode system 16 may be connected to the floating system 14. The feeder system 18 may be connected to the column system 12, the floating system 14, and/or the electrode system 16. The lock system 20 may be connected to the column system 12 and/or the floating system 14.

In some implementations, the column system 12 may comprise one or more of a variety of shapes, sizes, configurations, and/or materials. The column system 12 may include a first portion 24, a second portion 26, a third portion 28, a fourth portion 30, a first rail 32, and/or a second rail 34. The first portion 24 may be disposed adjacent to the base 22. The second portion 26 may be elongated and/or may extend from the first portion 24. The third portion 28 and/or the fourth portion 30 may be connected to the first portion 24 and/or the second portion 26. The third portion 28 and/or the fourth portion 30 may have substantially similar shapes. For instance, the third portion 28 and/or the fourth portion 30 may include shapes that are substantially polygonal (e.g., triangular, etc.). The column system 12 may be configured to support the floating system 14, the electrode system 16, the feeder system 18, and/or the lock system 20.

The first rail 32 and/or the second rail 34 may be fixed to the second portion 26 via a plurality of fasteners 36 (e.g., screws, bolts, inserts, among others). The first rail 32 and the second rail 34 may extend in a direction that is orthogonal (e.g., perpendicular) to the second portion 26. The first rail 32 and the second rail 34 may be disposed parallel to one another. The rails 32, 34 may have substantially similar shapes.

With reference to FIGS. 2-8, the floating system 14 may include a plate 40, a plurality of bearing assemblies 42 such as a first bearing assembly 42A, a second bearing assembly 42B, and/or a third bearing assembly 42C, a first bracket 44A, a second bracket 44B, a first energizer 46A (e.g., a bushing and/or a cushion, among others), a second energizer 46B, a first bushing 48A, and/or a second bushing 48B. The floating system 14 is configured to automatically return the electrode system 16 to a home position (e.g., a welding position) when an external force moves the electrode system away from the home position.

A plate 40 may comprise one or more of a variety of shapes, sizes, configurations, and/or materials. In some example configurations, the plate 40 may include a plurality of through holes (e.g., threaded holes). The plate 40 may include a shape that is substantially T-shaped. The plate 40 may be connected to the first rail 32 via the first bearing assembly 42A and/or the plate 40 may be connected to the second rail 34 via the second bearing assembly 42B and/or the third bearing assembly 42C.

In some implementations, the first bearing assembly 42A, the second bearing assembly 42B, and/or the third bearing assembly 42C may disposed between the plate 40 and the rails 32, 34. For instance, the first bearing assembly 42A may be disposed between the first rail 32 and the plate 40. The second bearing assembly 42B and/or the third bearing assembly 42C may be disposed between the second rail 34 and the plate 40. The first bearing assembly 42A, the second bearing assembly 42B, and/or the third bearing assembly 42C may be configured to facilitate the plate 40 to move relative to the rails 32, 34.

A bearing assembly 42 (e.g., the first bearing assembly 42A, the second bearing assembly 42B, and/or the third bearing assembly 42C) may comprise one or more of a variety of shapes, sizes, configurations, and/or materials. In some examples, a bearing assembly 42 may include a plurality of flat roller bearings. A bearing assembly 42 may include a shape that is substantially polygonal (e.g., rectangular, square, etc.).

A bracket 44 (e.g., the first bracket 44A and/or the second bracket 44B) may comprise one or more of a variety of shapes, sizes, configurations, and/or materials. In some examples, the first bracket 44A and/or the second bracket 44B may be fixed to the first rail 32 via fasteners (e.g., screws, bolts, inserts, among others).

Figure 2:
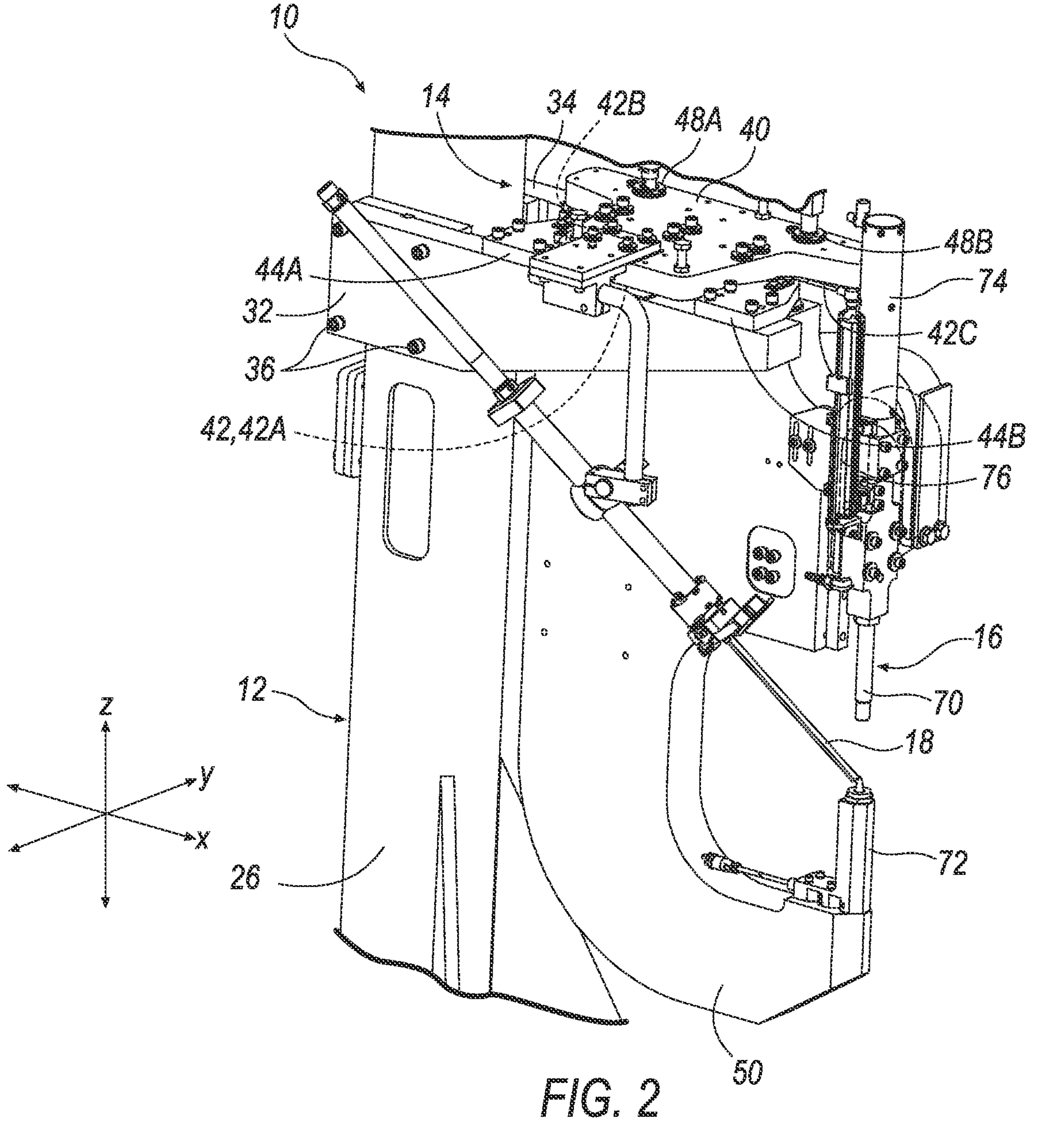
FIG. 2 is a partial perspective view generally illustrating an embodiment of a tool.
Figure 3:
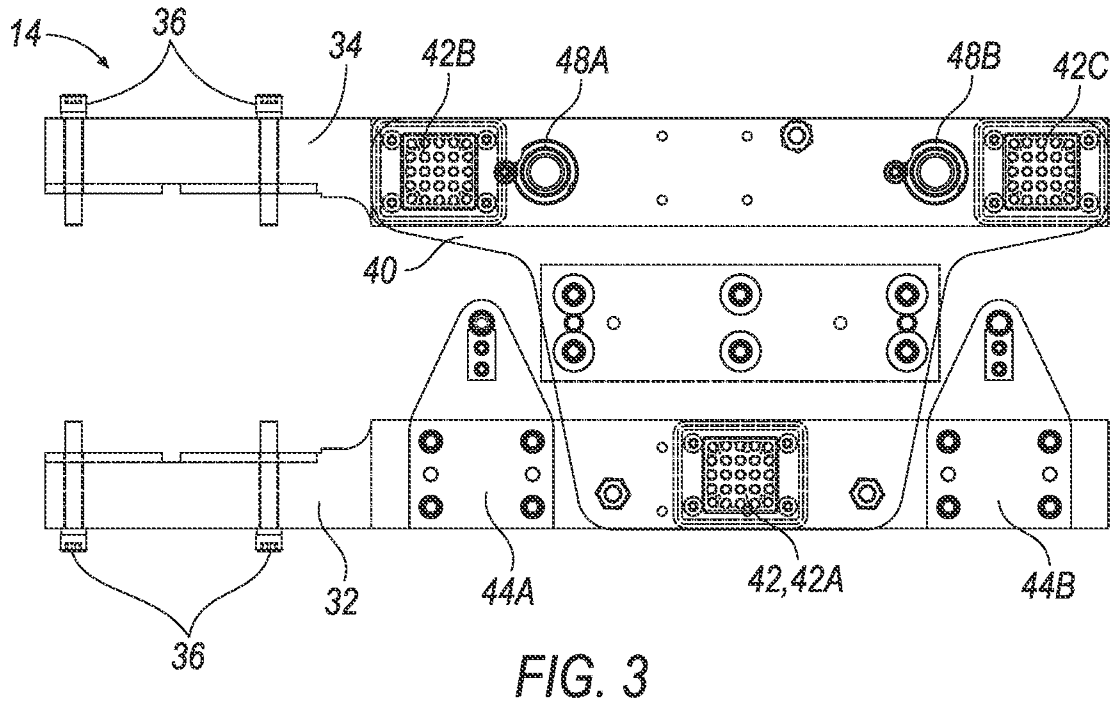
FIG. 3 is a top view generally illustrating an embodiment of a floating system of a tool.
Figure 4:
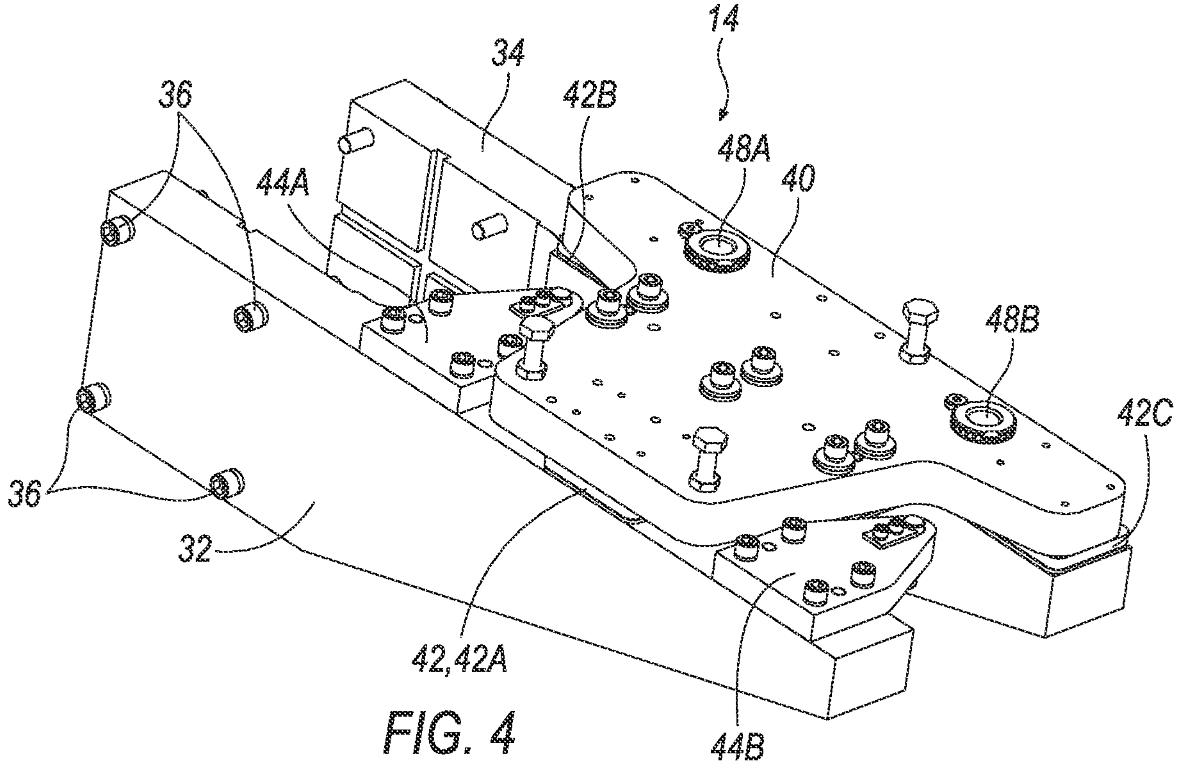
FIG. 4 is a perspective view generally illustrating an embodiment of a floating system of a tool.
Figure 5:
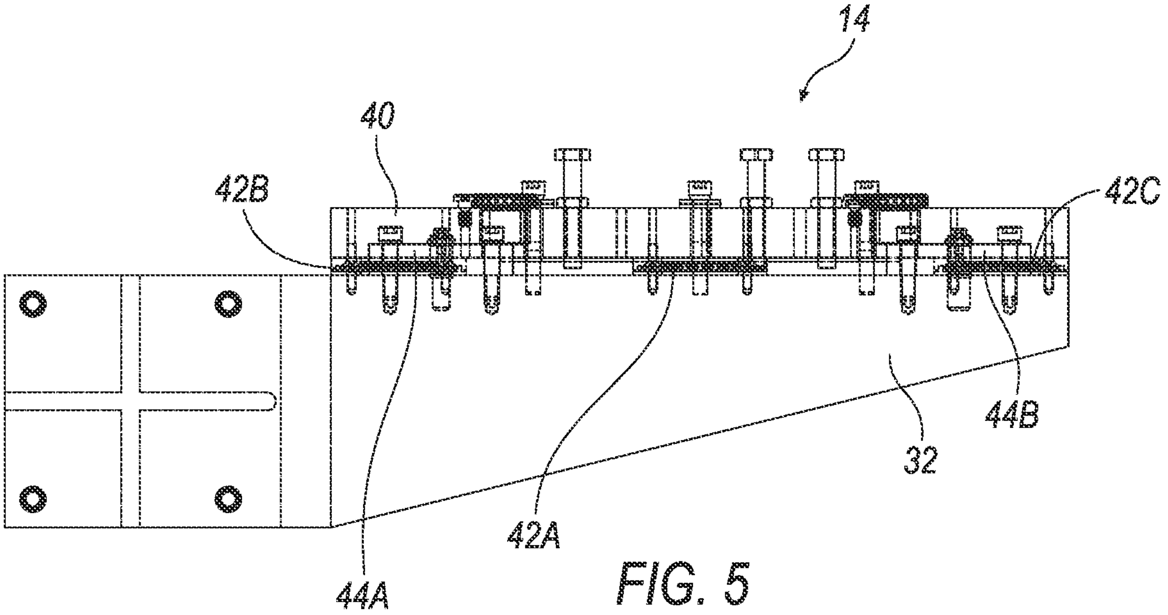
FIG. 5 is a side view generally illustrating an embodiment of a floating system of a tool.
Figure 6:
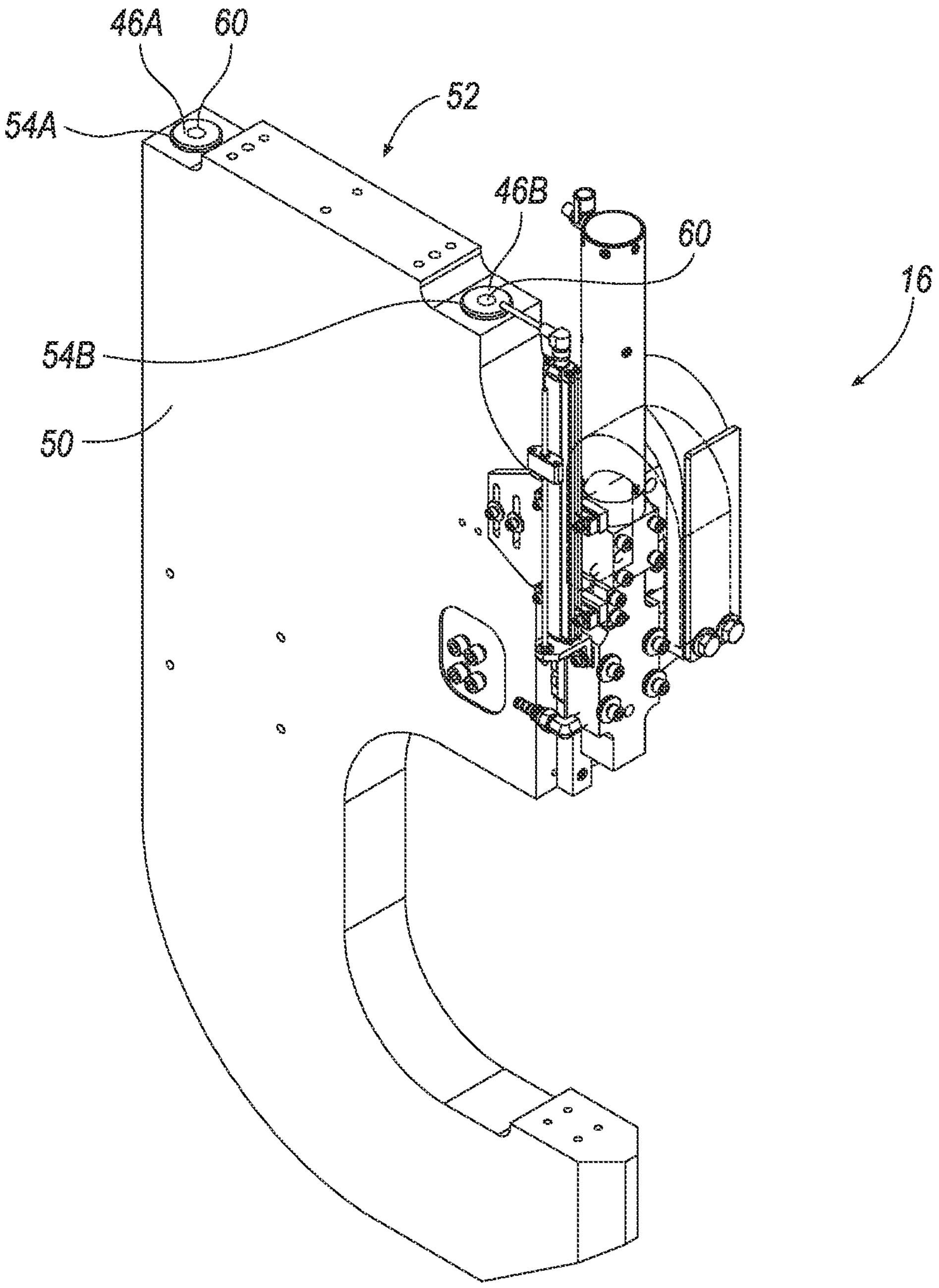
FIG. 6 is a partial perspective view generally illustrating an embodiment of an electrode system of a tool.

With reference to FIGS. 1, 2, and 6, the electrode system 16 is configured to connect (e.g., weld) fasteners (e.g., rivets, screws, nuts, clinch nuts, mechanical clips, and/or other mechanical fasteners), fed via the feeder system 18, to workpieces (e.g., stampings, brackets, etc.). The electrode system 16 includes a base 50. The base 50 may comprise one or more of a variety of shapes, sizes, configurations, and/or materials. The base 50 may be connected to the floating system 14. For instance, the base 50 may be connected to the plate 40, the first bracket 44A, and/or the second bracket 44B. A portion of the base 50 may be disposed between the first rail 32 and the second rail 34.

The base 50 may include an upper portion 52 having a plurality of holes (e.g., threaded holes). The holes of the upper portion 52 may correspond (e.g., are aligned) to holes of the plate 40. The base 50 may be fixed to the plate 40 via fasteners.

In some example configurations, the base 50 may include a first hole 54A configured to receive at least a portion of the first energizer 46A and/or a second hole 54B configured to receive at least a portion of the second energizer 46B. The first hole 54A and/or the second hole 54B may be disposed within the upper portion 52.

Figure 7A:
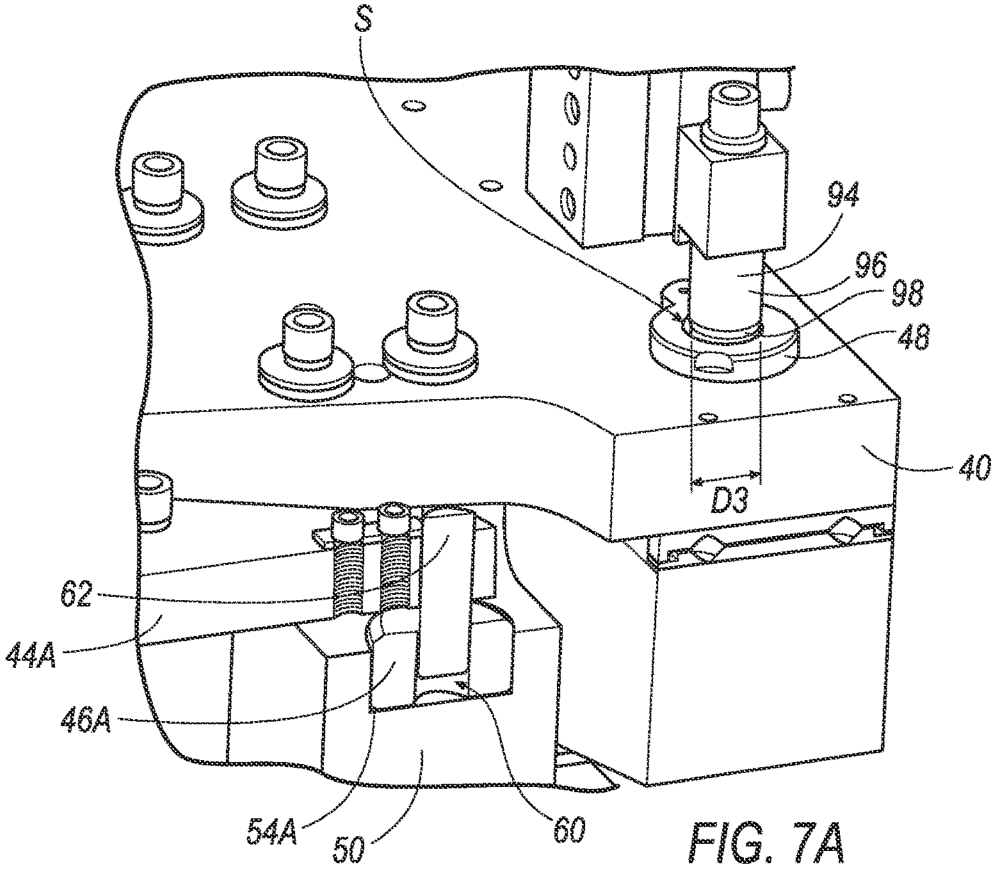
FIG. 7A is a partial perspective view generally illustrating an embodiment of a tool in a position.
Figure 7B:
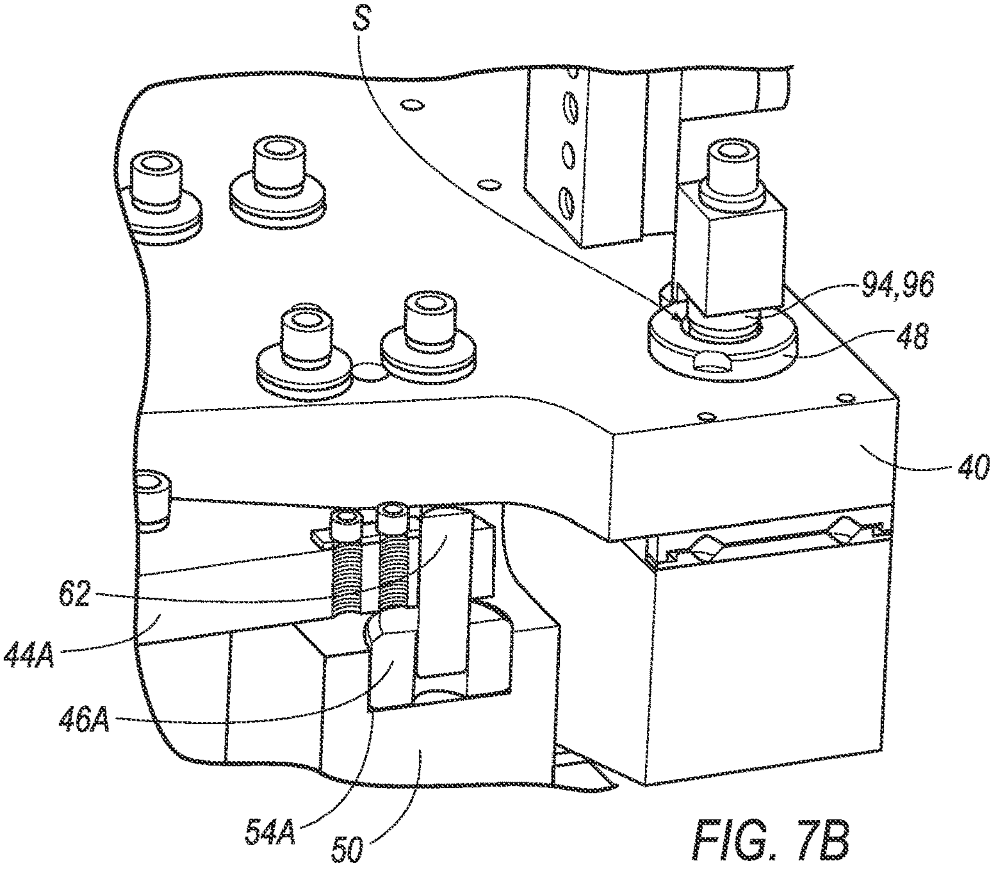
FIG. 7B is a partial perspective view generally illustrating an embodiment of a tool in an additional position.
Figure 8:
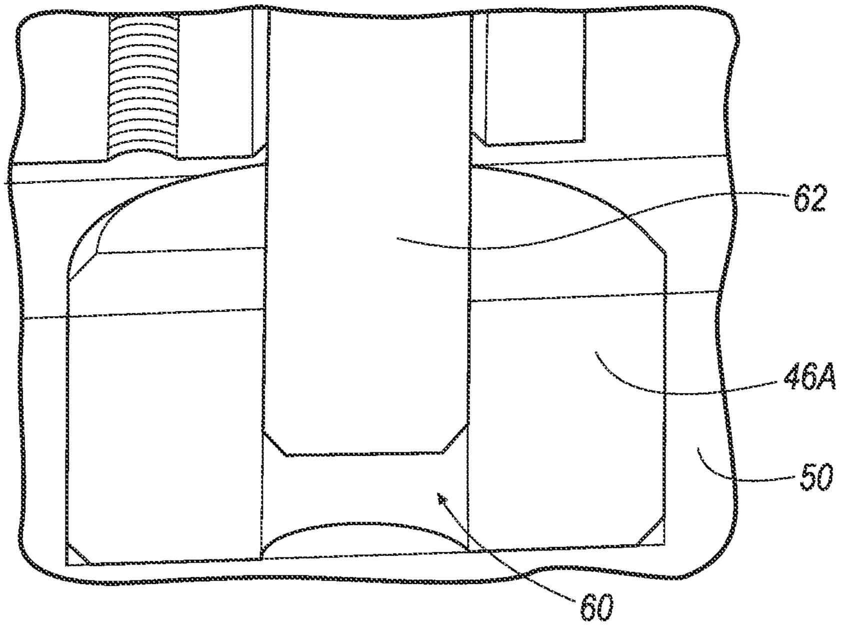
FIG. 8 is a partial perspective view generally illustrating an embodiment of a floating system of a tool.

With reference to FIGS. 6-8, an energizer 46 (e.g., the first energizer 46A and/or the second energizer 46B) may comprise one or more of a variety of shapes, sizes, configurations, and/or materials. An energizer 46 may include a substantially cylindrical configuration. An energizer 46 may include a hole 60 that is configured to receive a pin 62. In some example configurations, a first end of a pin 62 may be disposed within a hole 60 of an energizer 46 and/or a second end of the pin 62 may be disposed within a hole of a bracket 44. The base 50 of the electrode system 16 may be connected (e.g., at least indirectly) to the first bracket 44A via the first energizer 46A and a pin 62 and/or the base 50 may be connected (e.g., at least indirectly) to the second bracket 44B via the second energizer 46B and an additional pin 62.

In some implementations, an energizer 46 may comprise a urethane material (e.g., duro-20 urethane). An energizer 46 is configured to dampen the movement of the electrode system 16 and/or the floating system 14 relative to the column system 12. In some examples, adjusting the durometer of the energizer 46 may impact the damping effects of the energizer 46 on the electrode system 16 and/or the floating system 14.

Referring again to FIG. 2, the electrode system 16 may include a first electrode 70, a second electrode 72, an actuator 74, one or more sensors 76, and/or a controller (not depicted). The controller may be configured to control the welding operation. The controller may be electrically connected to the electrodes 70, 72, the actuator 74, and/or the sensors 76. In some example configurations, the first electrode 70, the second electrode 72, the actuator 74, and/or the sensors 68 may be supported by and/or connected to the base 50 of electrode system 16.

In some implementations, the first electrode 70 and the second electrode 72 may be configured to move relative to one another (e.g., in the Z-direction). For instance, the first electrode 70 may be moveable and the second electrode 70 may be stationary. The controller may be configured to move the first electrode 70 proximate to the second electrode via the actuator 74 such that the tool 10 may execute a welding operation.

The feeder system 18 may be configured to arrange a fastener (e.g., a nut) to be welded (not depicted) onto the second electrode 72. A machine (e.g., a robot arm) (not depicted) may be configured to move a workpiece (e.g., a stamping, a bracket, among others) in contact with the second electrode 72 and the fastener. The controller may be configured to move the first electrode 70 such that the first electrode 70 engages the workpiece and is aligned with second electrode 72 and the fastener. The controller may be configured to facilitate the execution of a welding operation such that the fastener is welded to the workpiece.

Figure 9:
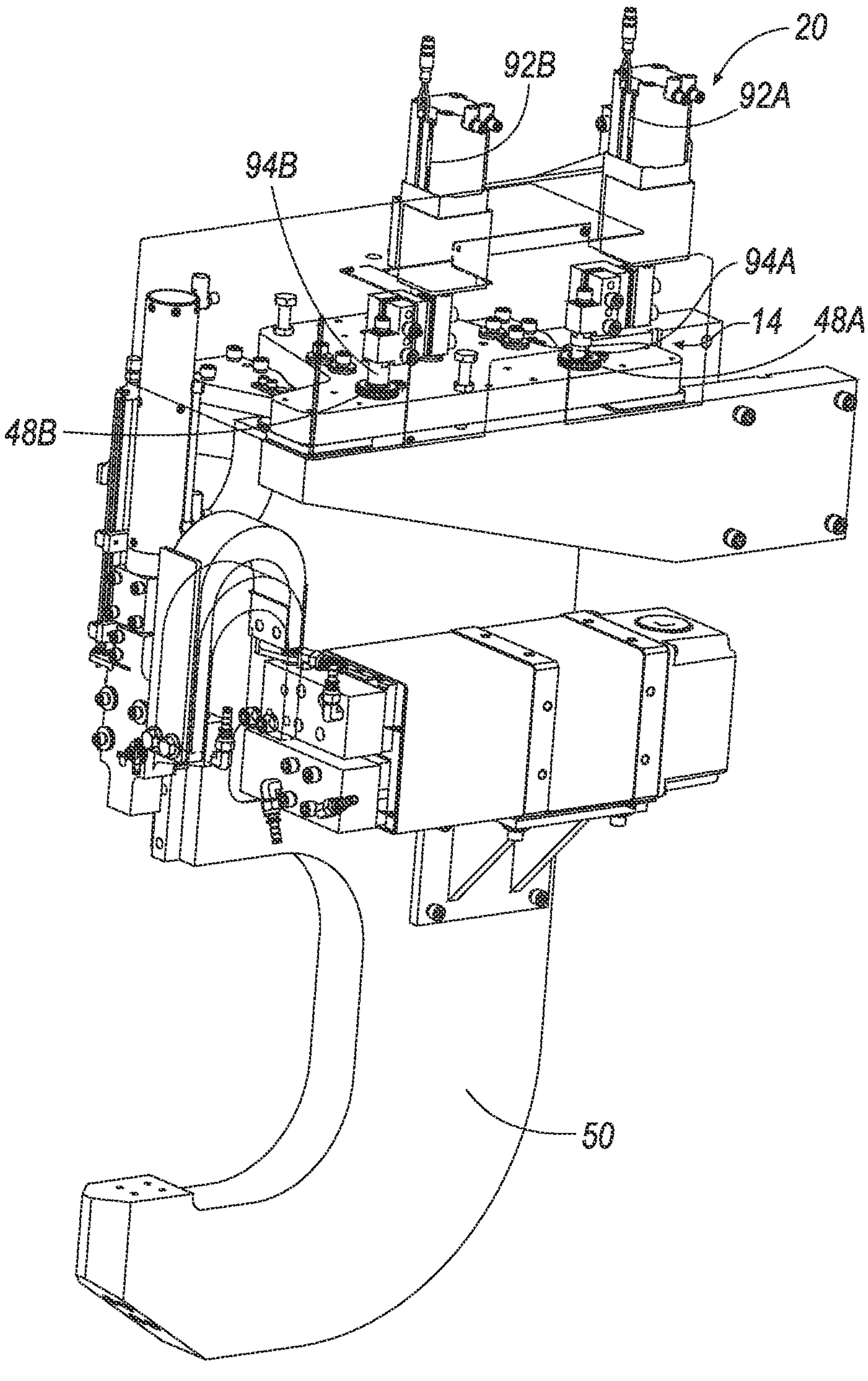
FIG. 9 is a partial perspective view generally illustrating an embodiment of a tool.
Figure 10:
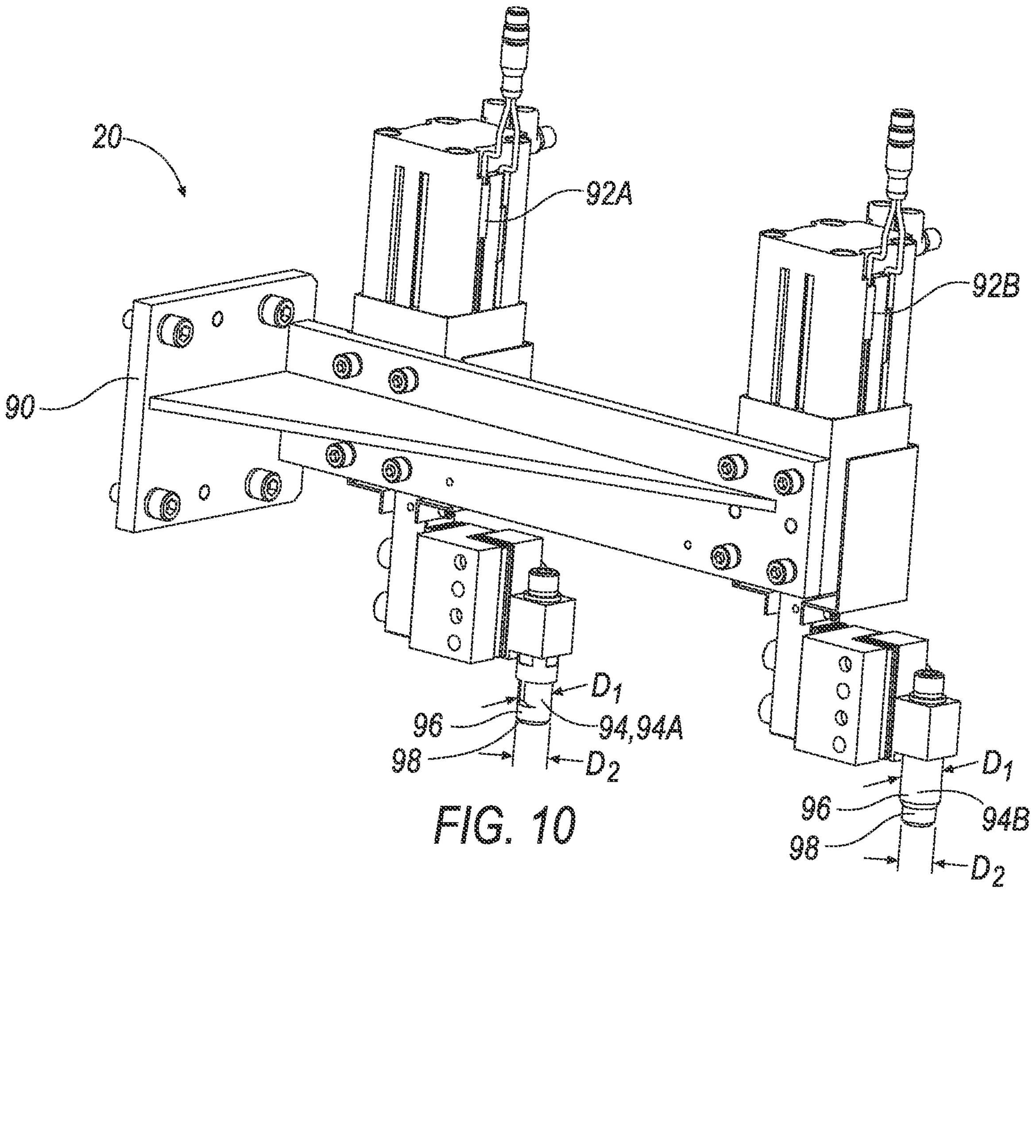
FIG. 10 is a perspective view generally illustrating an embodiment of a lock system of a tool.

With reference to FIGS. 9 and 10, the lock system 20 may include a support member 90, a first actuator 92A, a second actuator 92B, a first stepped pin 94A, and/or a second stepped pin 94B. The support member 90 may be connected to the column system 12 (e.g., the second portion 26). The actuators 92A, 92B may be connected to and/or supported by the support member 90. The actuators 92A, 92B may be electrically connected to a controller (not depicted). The controller may be configured to control the actuators 92, 92B. The first actuator 92A may be configured to move the first stepped pin 94A and/or the second actuator 92B may be configured to move the second stepped pin 94B. The lock system 20 may be configured to restrict and/or prevent movement of the floating system 14 and/or the electrode system 16 relative to the column system 12.

With reference to FIG. 10, a stepped pin 94 (e.g., the first stepped pin 94A and/or the second stepped pin 94B) may comprise one or more of a variety of shapes, sizes, configurations, and/or materials. A stepped pin 94 may include a first portion 96 and a second portion 98. The first portion 96 may include a first diameter D1 and/or the second portion 98 may include a second diameter D2. The first diameter D1 may be larger than the second diameter D2. For example and without limitation, the second diameter D2 may be approximately 2.5 cm smaller than the first diameter D1. The second diameter D2 may be smaller than an inner diameter D3 of a bushing 48 of the plate 40 (see, e.g., FIG. 7A).

With reference to FIGS. 7A and 7B, a stepped pin 94 may be configured to be disposed within a bushing 48 of the plate 40. In some examples, when a first portion 98 of a stepped pin 94 is disposed within a bushing 48, the first portion 98 engages the bushing 48 and/or the plate 40 is restricted from moving (see, e.g., FIG. 7B). For instance, the first diameter D1 of the first portion 96 may be approximately equal to or slightly less than the internal diameter D3 of the bushing 48. Additionally, when the first portion 98 is disposed within a bushing 48, the floating system 14 and/or the electrode system 16 may be restricted from moving relative to the column system 12.

In some examples, when the second portion 98 of the stepped pin 94 is disposed within a bushing 48, a space S is disposed between the second portion 98 and the bushing 48 since the diameter D2 of the second portion 98 is less than the inner diameter D3 of the bushing 48 (see, e.g., FIG. 7A). Additionally, when the second portion 98 is disposed within the bushing 48 the plate 40 may be configured to move (e.g., linearly) by a distance that is approximately equal to the space S (e.g., approximately 2.5 cm).

In some implementations, the lock system 20 may include a first configuration (e.g., a locked state) (see, e.g., FIG. 7B) and/or a second configuration (e.g., an operational state) (see, e.g., FIG. 7A). The first configuration may be associated with a shipping and/or a training mode, for example and without limitation, a mode in which it is desirable to restrict the floating system 14 and/or the electrode system 16 from moving. In the first configuration, the floating system 14 may be in a locked state such that the electrode system 16 is restricted from moving relative to the column system 12. The second configuration may be associated with an operation mode, for example, when the tool 10 is being used to manufacture and/or implement a process to a part. A first portion 96 of a stepped pin 94 may be disposed within a bushing 48 in the first configuration and/or a second portion 98 of a stepped pin 94 may be disposed within and/or may engage a bushing 48 in the second configuration.

Figure 11A:
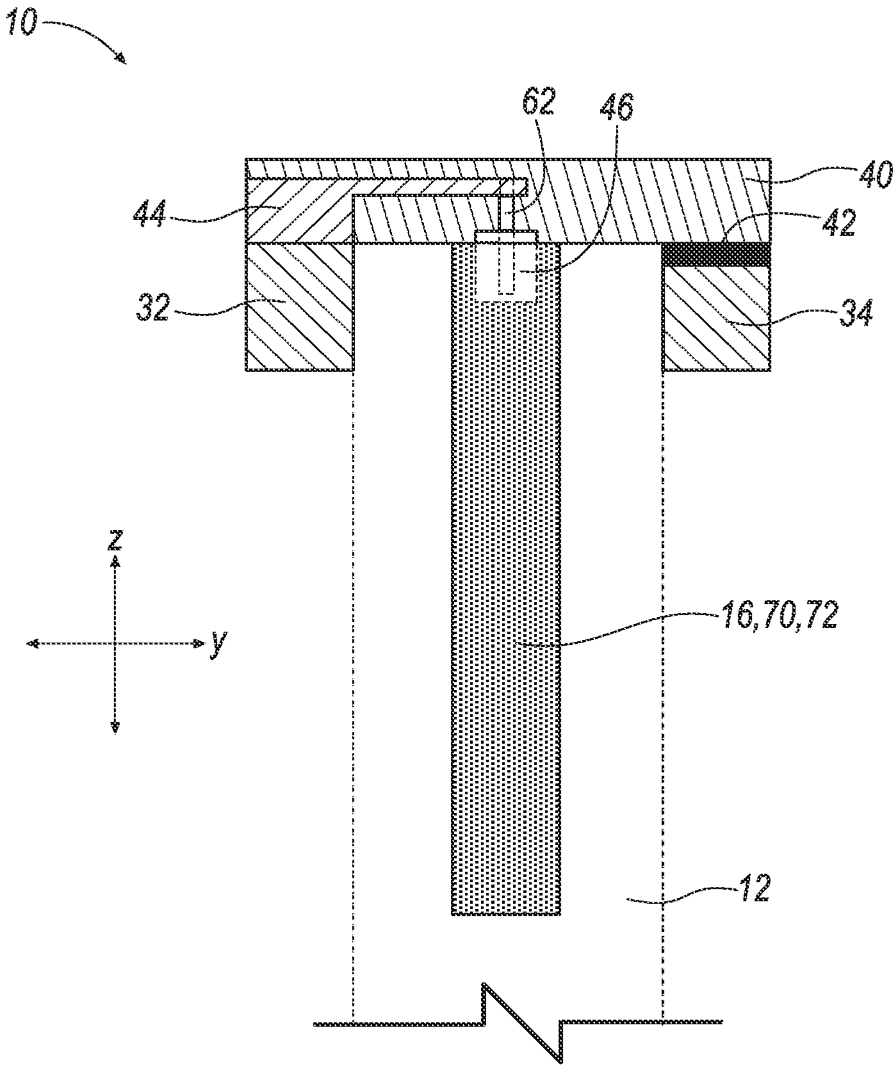
FIG. 11A is a schematic view generally illustrating an embodiment of a tool in a first position.
Figure 11B:
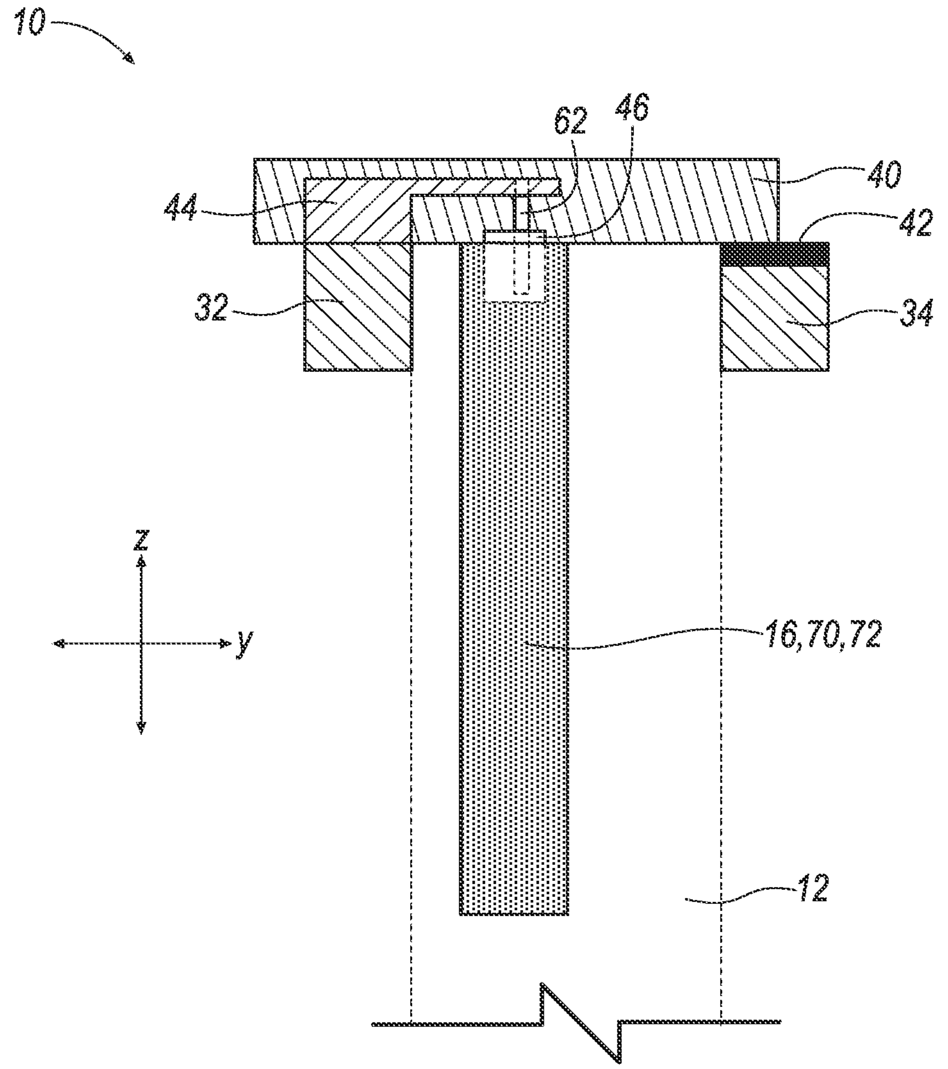
FIG. 11B is a schematic view generally illustrating an embodiment of a tool in a second position.

With reference to FIGS. 11A and 11B, during operation of the tool 10, an external force (e.g., an operator, a robot arm, among others) may undesirably move (e.g., force, bump, etc.) the electrode system 16 (e.g., electrodes 70, 72) out of a welding position (see, e.g., FIG. 11B). For instance, a welding position (e.g., a home position) includes a position such that the electrode system 16 is configured to weld a fastener to a workpiece (see, e.g., FIG. 11A). In some examples, if the electrode system 16 is moved out of the welding position the tool 10 will not be able to conduct the welding operation. The floating system 14 is configured to automatically return the electrode system 16 back to the welding position if an external force moves the electrode system 16 away from the welding position.

In some implementations, the electrode system 16 may be configured to move away from the welding position by a distance approximately equal to the space S between a second portion 98 of a stepped pin 94 and a bushing 48 of the plate 40. In some examples, the floating system 14 may be configured to move the electrode system 16 away from the welding position to compensate for and/or prevent damage that may be caused due to an undesirable external force contacting a portion of the electrode system 16. In some example configurations, the first energizer 46A and/or the second energizer 46B of the floating system 14 may configured to facilitate the return of the electrode system 16 to the welding position in accordance with the external force moving the electrode system 16 away from the welding position.

A method of operating a tool 10 may include providing a tool 10 with a column system 12, a floating system 14 connected to the column system 12, and/or an electrode system 16 connected to the floating system 14, the floating system 14 may include at least one energizer 46 and/or at least one bearing assembly 42, and/or automatically moving, via the floating system 14, the electrode system 16 to a home position (e.g., FIG. 11A) in accordance with an external force moving the electrode system 16 away from the home position (e.g., FIG. 11B).

Figure 12:
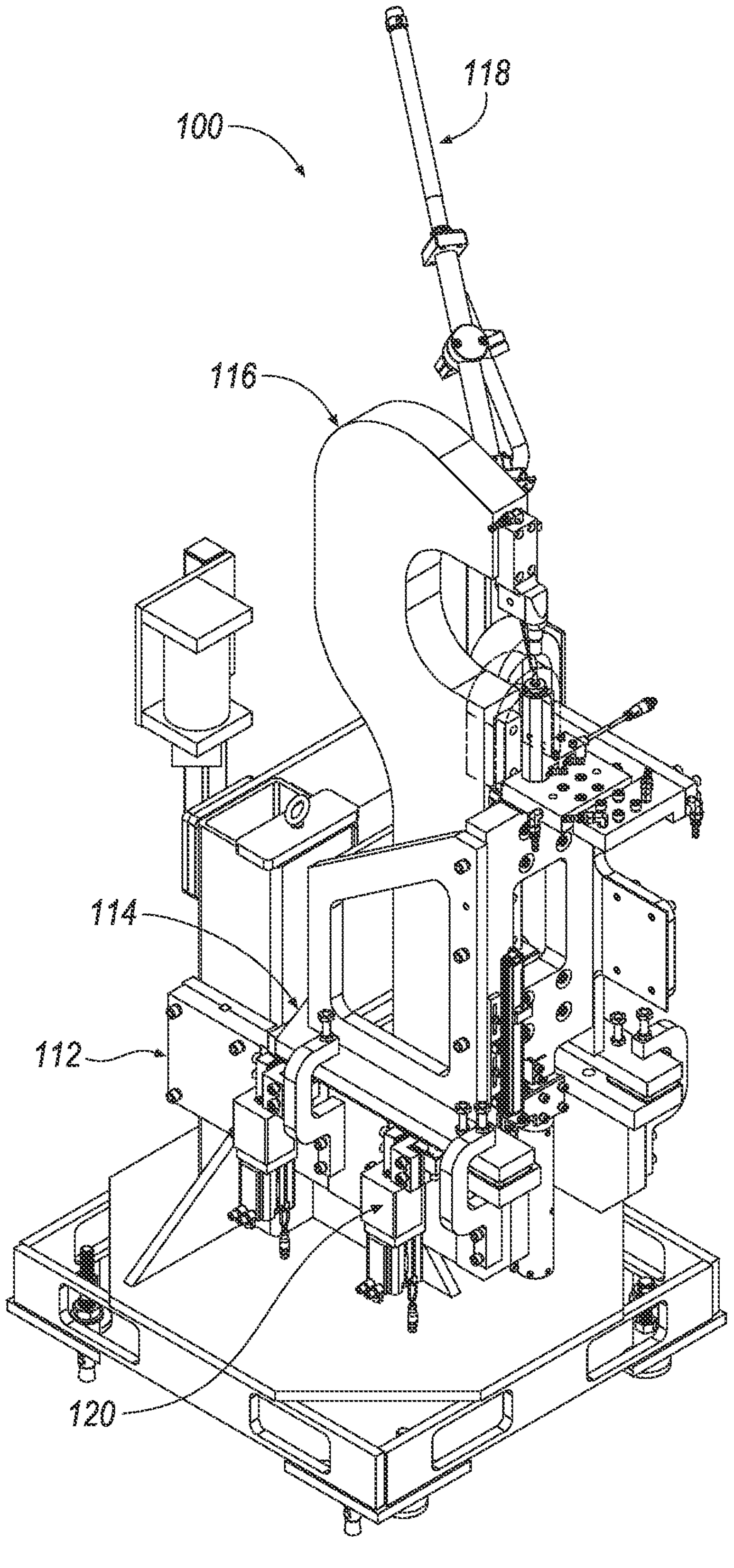
FIG. 12 is a perspective view generally illustrating an embodiment of another tool.
Figure 13:
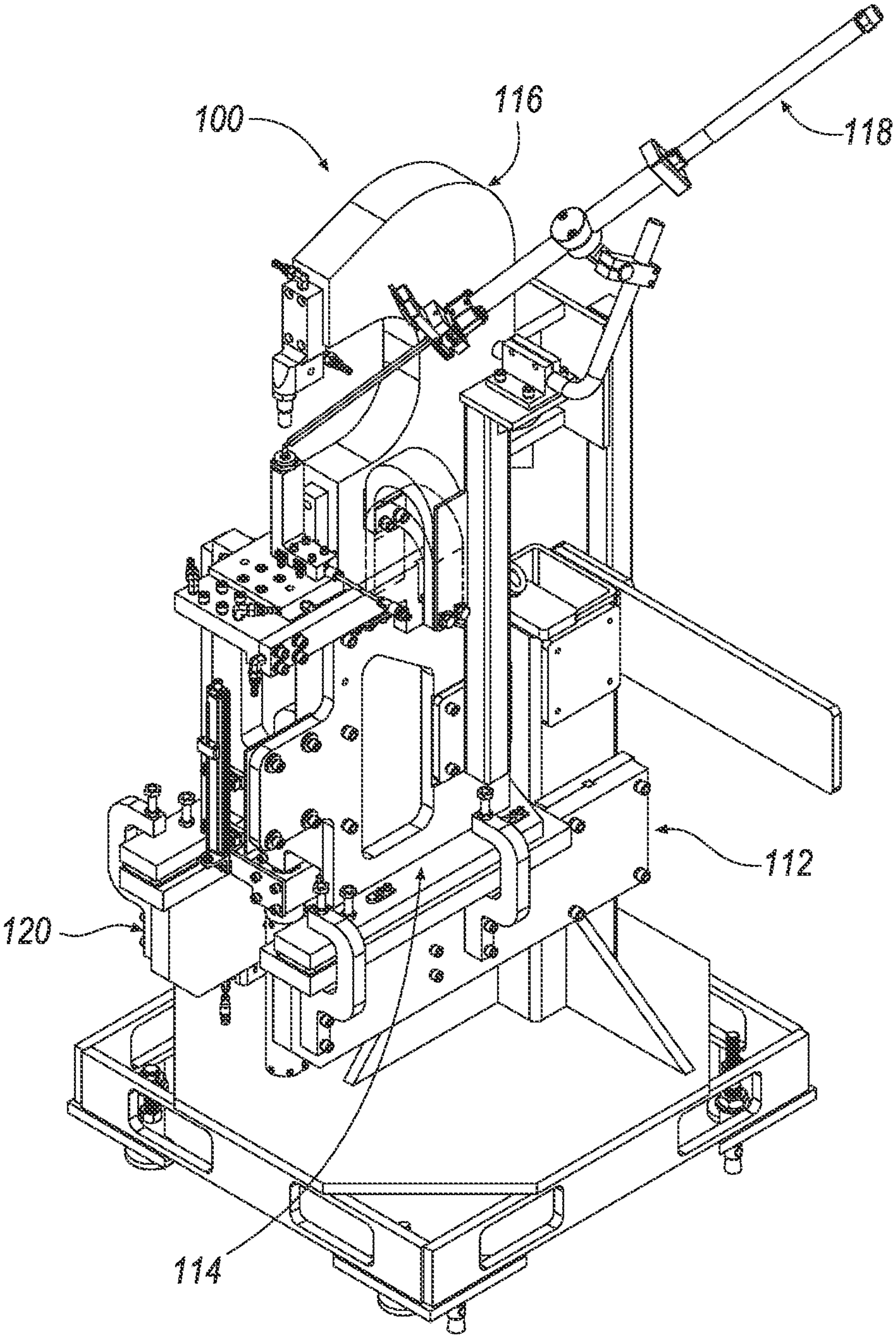
FIG. 13 is an additional perspective view generally illustrating an embodiment of another tool.
Figure 14:
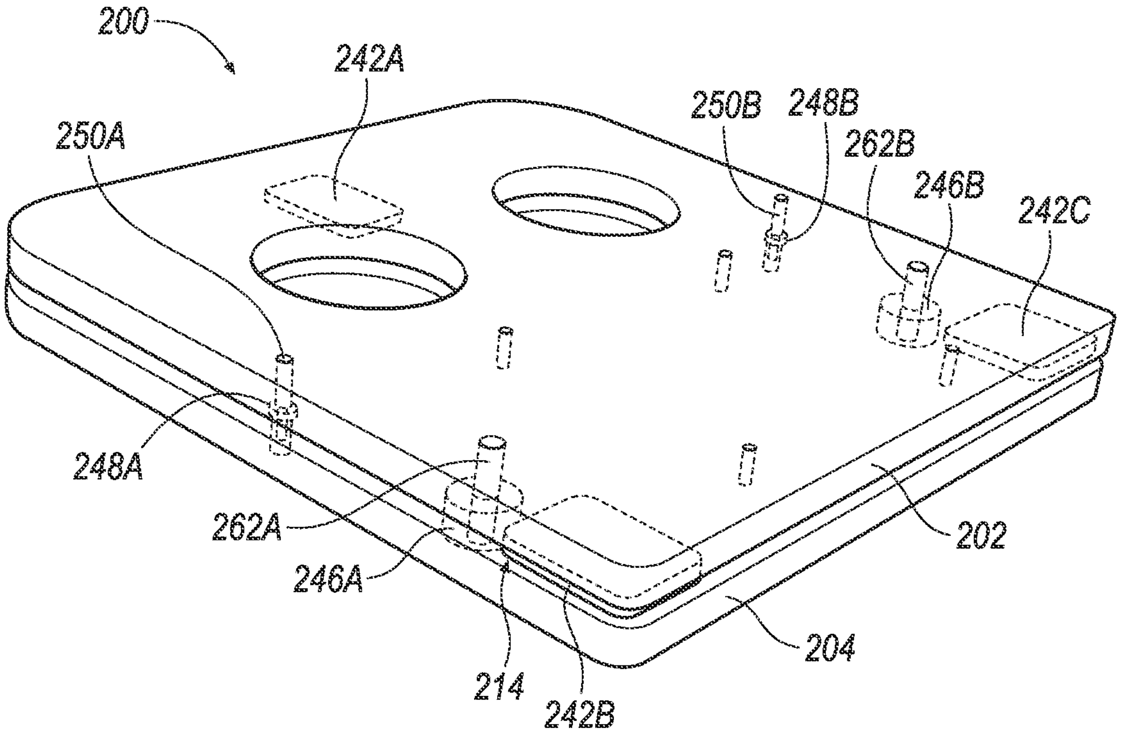
FIG. 14 is a perspective view generally illustrating an embodiment of yet another tool.

With reference to FIGS. 12 and 13, another tool 100 is shown. The structure and function may be substantially similar to that of the tool 10, apart from any exceptions described below and/or shown in the figures. Accordingly, the structure and/or function of similar features will not be described again in detail.

In some example configurations, the tool 100 may include a column system 112, a floating system 114, an electrode system 116, a feeder system 118, and/or a lock system 120. The floating system 114 may be connected to the column system 112. The electrode system 116 may be connected to the floating system 114. The feeder system 118 may be connected to the column system 112, the floating system 114 and/or the electrode system 116. The lock system 120 may be connected to the column system 112 and/or the floating system 114.

In some implementations, at least a portion of the floating system 114 and/or at least a portion of the lock system 120 may be disposed below the electrode system 116. In some example configurations, a substantial portion of the floating system 114 and/or a substantial portion of the lock system 120 may be disposed below the electrode system 116. The floating system 114 may be configured to return the electrode system 116 to a welding position (e.g., a home position) if an external force moves the electrode system 116 away from the welding position.

With reference to FIGS. 14-17, yet another tool 200 (e.g., a compliance base) is shown. The tool 200 may be used in connection with certain tabletop manufacturing operations. In some implementations, the tool 200 is configured to support one or more workpieces (e.g., stampings, etc.) (not depicted) such that the workpieces may undergo certain processes and/or operations (e.g., manufacturing operations, dimensional verifications, among others).

In some examples configurations, the tool 200 may include a first plate 202, a second plate 204, and/or a floating system 214. The floating system 214 may be at least partially disposed between the first plate 202 and the second plate 204. The first plate 202 may be configured to support and/or engage a workpiece and/or the second plate 204 may be supported by and/or may be connected to a table (not depicted). The first plate 202 may be disposed parallel to and/or adjacent to the second plate 204 such that the first plate 202 is spaced apart from the second plate 204. The first plate 202 may be configured to move relative to the second plate 204, for example and without limitation, via the floating system 214.

The plates 202, 204 may comprise one or more of a variety of shapes, sizes, configurations, and/or materials. The plates 202, 204 may have configurations that are substantially similar. For instance, the plates 202, 204 may have shapes that are substantially polygonal (e.g., rectangular, square, etc.).

The structure and function of the floating system 214 may be substantially similar to that of the floating systems 14, 114, apart from any exceptions described below and/or shown in the figures. Accordingly, the structure and/or function of similar features will not be described again in detail.

The floating system 214 may include a plurality of bearing assemblies 242 such as a first bearing assembly 242A, a second bearing assembly 242B, and/or a third bearing assembly 242C, a first energizer 246A, a second energizer 246B, a first pin 262A used in connection with the first energizer 246A, a second pin 262B used in connection with the second energizer 246B, a first bushing 248A, a second bushing 248B, a first control pin 250A used in connection with the first bushing 248A, and/or a second control pin 250B used in connection with the second bushing 248B. The floating system 214 may be configured to automatically return the first plate 202 to a home position (e.g., a first position) (see, e.g., FIG. 15A) if an external force moves the first plate 202 away from the home position (see. e.g., FIG. 15B).

A bearing assembly 242 (e.g., the first bearing assembly 242A, the second bearing assembly 242B, and/or the third bearing assembly 242C) may be configured in the same or a similar manner as a bearing assembly 42 of the tool 10. An energizer 246 (e.g., the first energizer 246A and/or the second energizer 246B) may be configured in the same or a similar manner as an energizer 46 of the tool 10. A pin 262 (e.g., the first pin 262A and/or the second pin 262B) may be configured in the same or a similar manner as a pin 62 of the tool 10. A bushing 248 (e.g., the first bushing 248A and/or the second bushing 248B) may be configured in the same or a similar manner as a bushing 48 of the tool 10.

Figure 16:
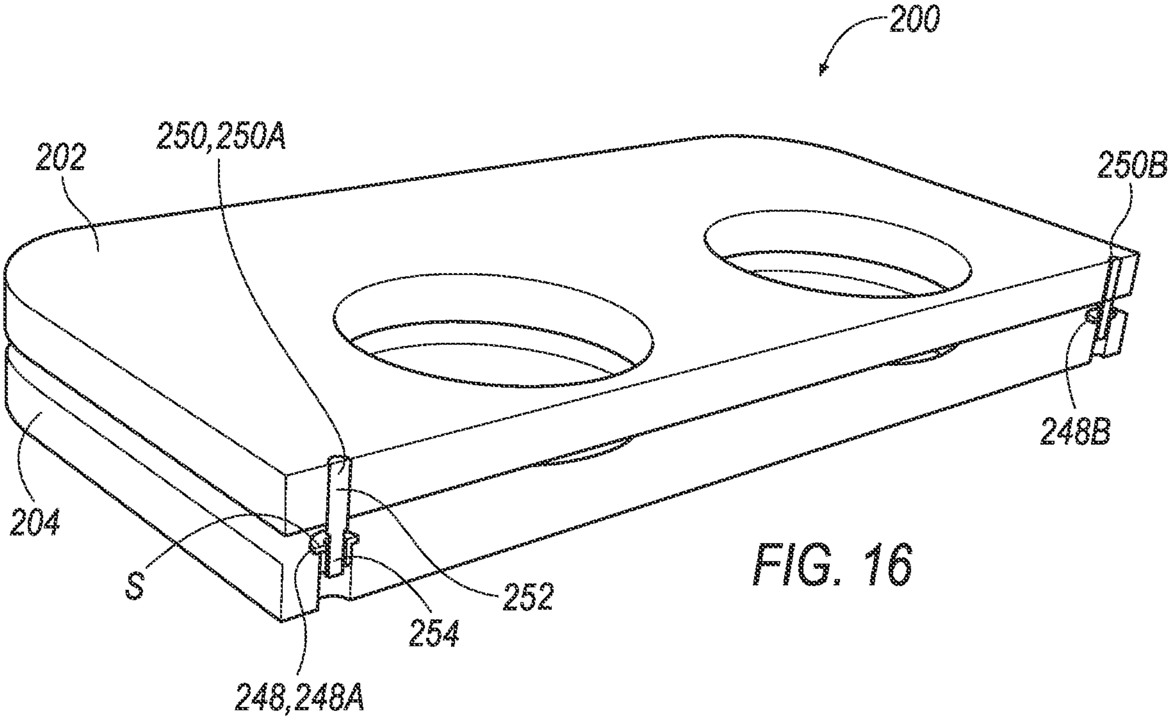
FIG. 16 is a cross-sectional view generally illustrating an embodiment of yet another tool.

With reference to FIG. 16, the first bushing 248A and/or the second bushing 248B may be at least partially disposed within the second plate 204. In some example configurations, a control pin 250 (e.g., the first control pin 250A and/or the second control pin 250B) may include a first portion 252 and a second portion 254. The first portion 252 may include a diameter that is greater than a diameter of the second portion 254. At least a part of the first portion 252 may be disposed within the first plate 202 and/or a least a part of the second portion 254 may be disposed within a hole of the bushing 248. The hole of bushing 248 may include a diameter that is larger than the diameter of the second portion 254 such that a space S is disposed between the second portion 254 and the bushing 248. In some instances, the first plate 202 may be configured to move relative to the second plate 204 by a distance that is approximately equal to the space S.

Figure 17:
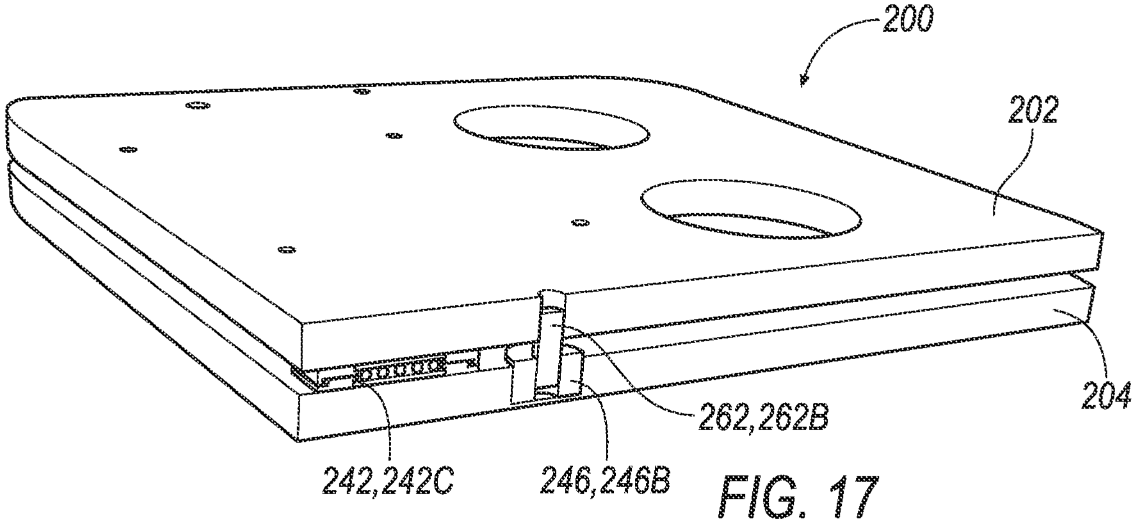
FIG. 17 is another cross-sectional view generally illustrating an embodiment of yet another tool.
Figure 18:
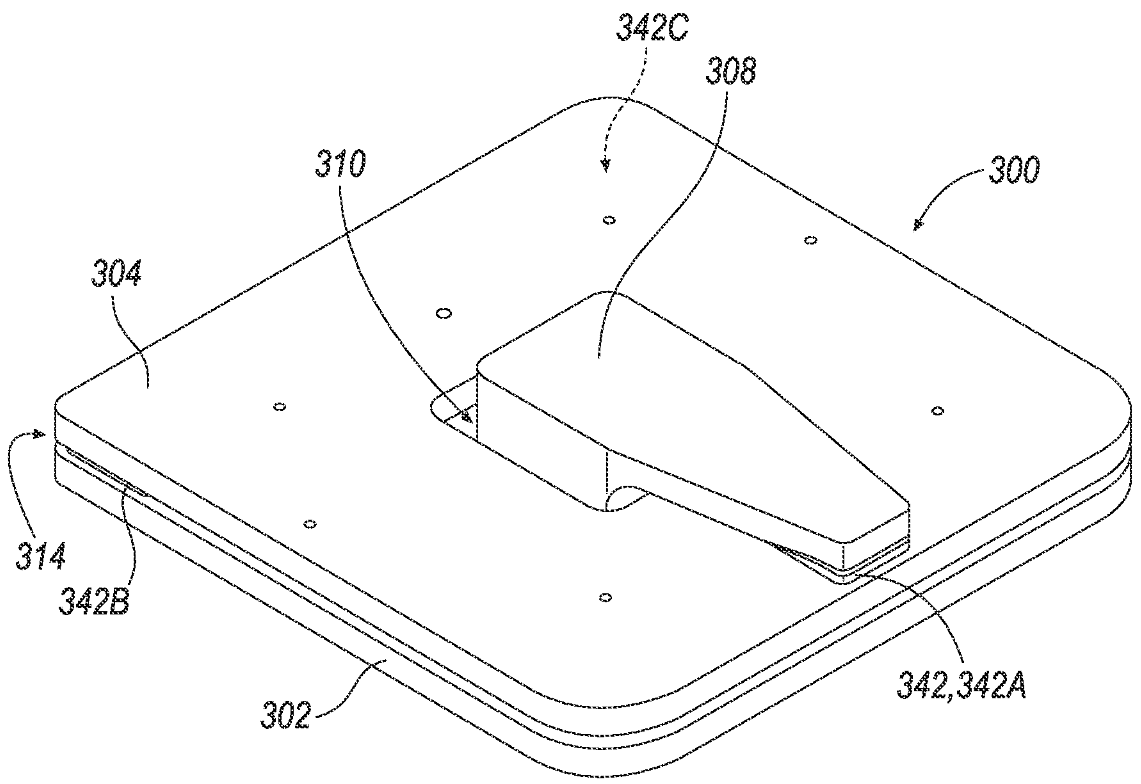
FIG. 18 is a perspective view generally illustrating an embodiment of an additional tool.
Figure 19:
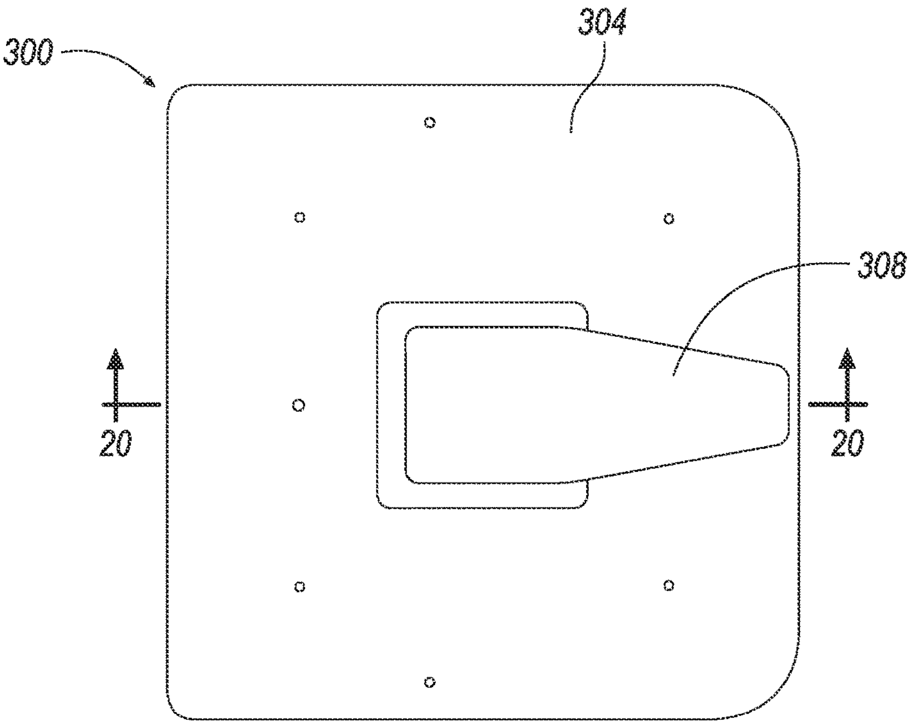
FIG. 19 is a top view generally illustrating an embodiment of an additional tool.

With reference to FIG. 17, an energizer 246 (e.g., the first energizer 246A and/or the second energizer 246B) may be at partially disposed within the second plate 204. A bearing assembly 242 (e.g., the first bearing assembly 242A, the second bearing assembly 242B, and/or the third bearing assembly 242C) may be disposed between the first plate 202 and the second plate 204. A portion (e.g., a first end) of a pin 262 (e.g., the first pin 262A and/or the second pin 262B) may be disposed within the first plate 202 and/or an additional portion (e.g., a second end) of the pin 262 may be disposed within a hole of the energizer 246.

Figure 15A:
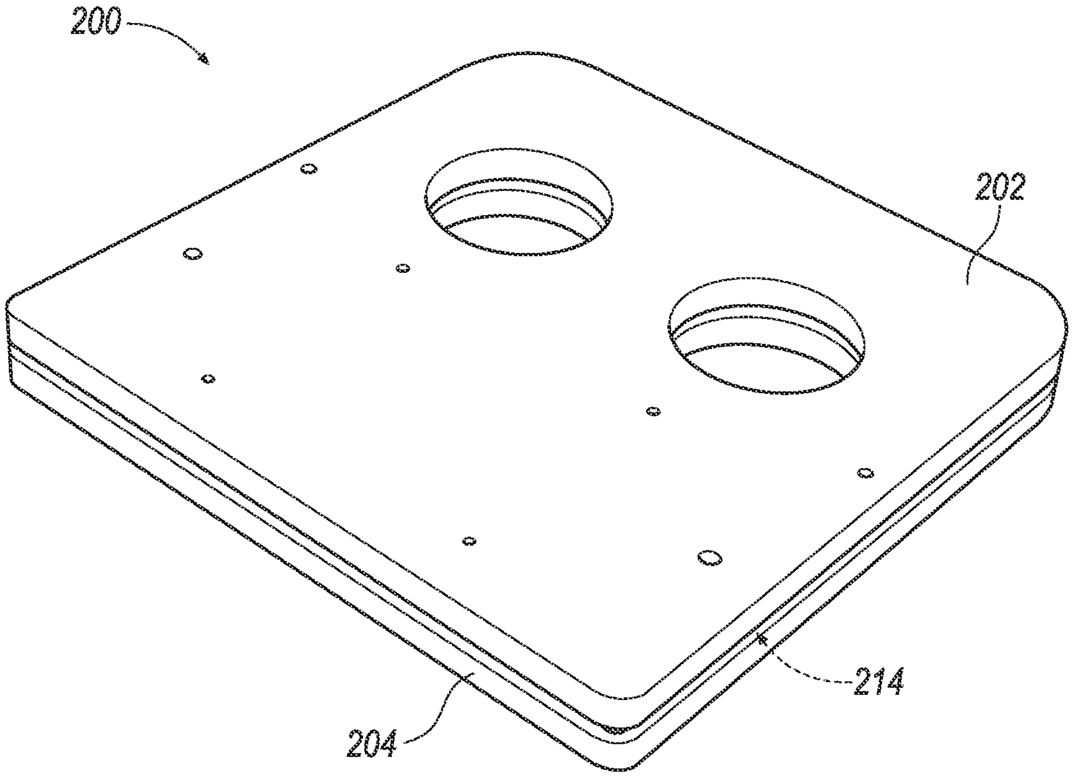
FIG. 15A is a perspective generally illustrating an embodiment of yet another tool in a first position.
Figure 15B:
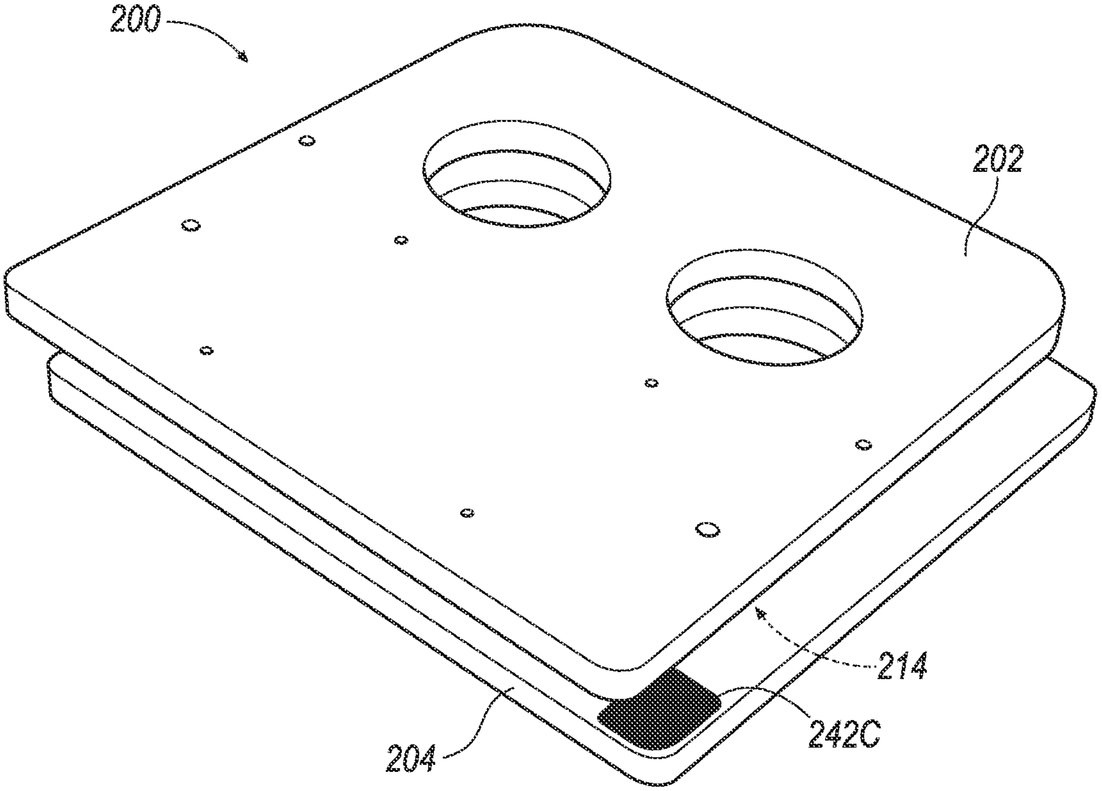
FIG. 15B is a perspective generally illustrating an embodiment of yet another tool in a second position.

Referring now to FIGS. 15A and 15B, during operation of the tool 200, an external force (e.g., an operator, a robot arm, among others) may undesirably move (e.g., force, bump, etc.) the first plate 202 out of a home position (see, e.g., FIG. 15B). In some instances, a home position (see, e.g., FIG. 15A) may include a position in which the first plate 202 is aligned with the second plate 204 and/or a workpiece may be worked upon. The tool 200 may be configured to move away from the home position to avoid damage that may be caused in connection with the external force being applied to the first plate 202. For example and without limitation, damage that may be caused to a workpiece and/or a robot arm, etc. The floating system 214 is configured to automatically return the first plate 202 back to the home position if an external force moves the first plate 202 away from the home position.

A method of operating a tool 200 may include providing a tool 200 with a first plate 202, a second plate spaced apart from the first plate 202, and/or a floating system 214 at least partially disposed between the first plate 202 and the second plate 204, the floating system 214 may include at least one energizer 246 and/or at least one bearing assembly 242, the first plate 202 may move relative to the second plate 204, and/or automatically moving, via the floating system 214, the first plate 202 to a home position (e.g., FIG. 15A) in accordance with an external force moving the first plate 202 away from a home position (e.g., FIG. 15B).

With reference to FIGS. 18-21, an additional tool 300 (e.g., a compliance base) is shown. The structure and function may be substantially similar to that of tool 200, apart from any exceptions described below and/or shown in the figures. Accordingly, the structure and/or function of similar features will not be described again in detail.

The tool 300 is used to impart a process to a part, wherein the tool 300 may include a first plate 302, a second plate 304, a cantilever portion 308, and/or a floating system 314. In some example configurations, the cantilever portion 308 may be connected to the first plate 302. The second plate 304 may include a void 310 and/or a portion of the cantilever portion 308 may be disposed within the void 310. The second plate 304 may be disposed between the first plate 302 and a portion of the cantilever portion 308.

The structure and function of the floating system 314 may be substantially similar to that of the floating systems 14, 114, 214 apart from any exceptions described below and/or shown in the figures. Accordingly, the structure and/or function of similar features will not be described again in detail.

The floating system 314 may include a plurality of bearing assemblies 342 such as a first bearing assembly 342A, a second bearing assembly 342B, and/or a third bearing assembly 342C, a first energizer 346A, a second energizer 246B, a first pin 362A used in connection with the first energizer 346A, a second pin 362B used in connection with the second energizer 346B, a first bushing 348A, a second bushing 348B, a first control pin 350A used in connection with the first bushing 348A, and/or a second control pin 350B used in connection with the second bushing 348B. The floating system 314 may be configured to automatically return the first plate 302 to a home position (e.g., a first position) if an external force moves the first plate 302 away from the home position. The floating system 314 is configured to have a self-returning aspect or feature.

A bearing assembly 342 (e.g., the first bearing assembly 342A, the second bearing assembly 342B, and/or the third bearing assembly 342C) may be configured in the same or a similar manner as a bearing assembly 42 of the tool 10 and/or a bearing assembly 242 of the tool 200. An energizer 346 (e.g., the first energizer 346A and/or the second energizer 346B) may be configured in the same or a similar manner as an energizer 46 of the tool 10 and/or an energizer 246 of the tool 200. A pin 362 (e.g., the first pin 362A and/or the second pin 362B) may be configured in the same or a similar manner as a pin 62 of the tool 10 and/or a pin 262 of the tool 200. A bushing 348 (e.g., the first bushing 348A and/or the second bushing 348B) may be configured in the same or a similar manner as a bushing 48 of the tool 10 and/or a bushing 248 of the tool 200.

Figure 20:
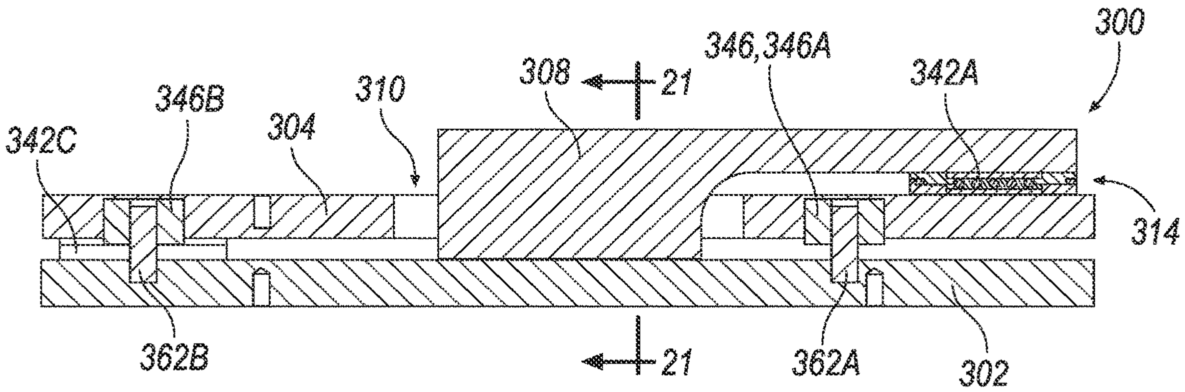
FIG. 20 is a cross-sectional view generally illustrating an embodiment of an additional tool.
Figure 21:
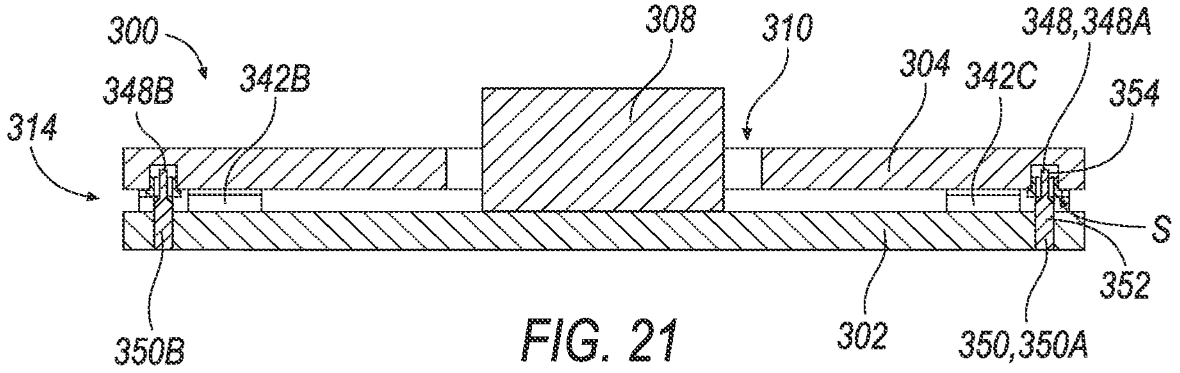
FIG. 21 is a cross-sectional view generally illustrating an embodiment of an additional tool.

With reference to FIGS. 20 and 21, in some example configurations, a first bearing assembly 342A may be disposed between the cantilever portion 308 and the second plate 304 and/or the second bearing assembly 342B and/or the third bearing assembly 342C may be disposed between the first plate 302 and the second plate 304. An energizer 346 (e.g., the first energizer 346A and/or the second energizer 346B) may be at least partially disposed within the second plate 304. A portion (e.g., a first end) of a pin 362 (e.g., the first pin 362A and/or the second pin 362B) may be disposed within the first plate 302 and/or an additional portion (e.g., a second end) of the pin 362 may be disposed within a hole of the energizer 346.

Referring now to FIG. 21, the first bushing 348A and/or the second bushing 348B may be at least partially disposed within the second plate 304. In some example configurations, a control pin 350 (e.g., the first control pin 350A and/or the second control pin 350B) may include a first portion 352 and a second portion 354. The first portion 352 may include a diameter that is greater than a diameter of the second portion 354. At least a part of the first portion 352 may be disposed within the first plate 302 and/or a least a part of the second portion 354 may be disposed within a hole of the bushing 348. The hole of bushing 348 may include a diameter that is larger than the diameter of the second portion 354 such that a space S is disposed between the second portion 354 and the bushing 248. In some instances, the first plate 302 may be configured to move relative to the second plate 304 by a distance that is approximately equal to the space S.

As another example, a controller may include an electronic controller and/or include an electronic processor, such as a programmable microprocessor and/or microcontroller. In embodiments, a controller may include, for example, an application specific integrated circuit (ASIC). A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer/computing device, a controller, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A tool comprising:

a column system;

a floating system connected to the column system, the floating system comprising a plate and a bearing assembly connected to the plate;

an energizer supported by the plate, the energizer comprising a resilient material defining a hole; and an electrode system connected to the floating system and including a pin extending into the hole;

wherein movement of the electrode system away from a home position causes the pin to compress the resilient material, and the resilient material is configured to exert a restoring force on the pin to automatically return the electrode system to the home position.

2. The tool of claim 1, wherein the floating system includes a second energizer comprising a second resilient material defining a second hole.

3. The tool of claim 2, wherein the resilient material of the energizer and second resilient material of the second energizer comprise a urethane material.

4. The tool of claim 1, wherein:

the column system includes a rail;

the floating system further includes a bracket, the bracket is connected to the rail; the resilient material of the energizer is at least partially disposed within a hole of a base of the electrode system; and the pin is in contact with the energizer and the bracket.

5. The tool of claim 4, wherein the bearing assembly is disposed between the rail and the plate.

6. The tool of claim 5, wherein the base of the electrode system is connected to the plate of the floating system.

7. The tool of claim 1, including a locking system connected to the column system;

wherein the locking system includes an actuator and a stepped pin connected to the actuator;

the stepped pin includes a first portion and a second portion, the second portion has a smaller diameter than the first portion; and the actuator moves the stepped pin from a first position to a second position.

8. The tool of claim 7, wherein, in accordance with the stepped pin being in the first position, the floating system is in a locked state such that the electrode system is restricted from moving relative to the column system; and wherein, in accordance with the stepped pin being in the second position, the floating system is in an operational state.

9. The tool of claim 8, wherein a plate of the floating system includes a bushing; and in accordance with the stepped pin being in the first position, the first portion of the stepped pin is disposed within the bushing.

10. The tool of claim 9, wherein, in accordance with the stepped pin being in the second position, the second portion of the stepped pin is disposed within the bushing such that a space is disposed between the second portion and the bushing; and the electrode system is capable of moving relative to the column system by a distance that is approximately equal to a distance of the space.

11. The tool of claim 1, wherein at least a portion of the floating system is disposed above the electrode system.

12. The tool of claim 1, wherein at least a portion of the floating system is disposed below the electrode system.

13. The tool of claim 1, wherein the tool is configured to produce an article of manufacture.

14. A tool, comprising:

a first plate;

a second plate spaced apart from the first plate; and a floating system comprising at least one bearing assembly disposed between the first plate and the second plate to facilitate relative movement therebetween;

an energizer supported by the second plate, the energizer comprising a resilient material and defining a hole; and a pin connected to the first plate and extending into the hole;

wherein movement of the first plate relative to the second plate away from a home position causes the pin to compress the resilient material and the resilient material exerts a restoring force on the pin to automatically return the first plate to the home position.

15. The tool of claim 14, wherein the energizer is at least partially disposed within the second plate.

16. The tool of claim 14, wherein the floating system includes a second energizer comprising a second resilient material.

17. The tool of claim 14, wherein the floating system includes a first bearing assembly.

18. The tool of claim 14, wherein the floating system includes a second bearing assembly and a third bearing assembly.

19. The tool of claim 18, wherein the first bearing assembly is disposed proximate a first end of the tool; and the second bearing assembly and the third bearing assembly are disposed proximate a second end of the tool.

20. A tool for making an article, the tool comprising:

a column system;

a floating system connected to the column system, the floating system comprising a plate and a bearing assembly connected to the plate;

an energizer supported by the plate, the energizer comprising a resilient member and defining a hole; and an electrode system connected to the floating system and including a pin extending into the hole defined by the resilient member, wherein after an article is manufactured, the energizer is configured to bias the pin toward a center of the hole to automatically return the electrode system to a home position.

* * * * *